United States Patent
Clarke

(10) Patent No.: US 10,722,062 B1
(45) Date of Patent: Jul. 28, 2020

(54) CURTAIN PULL

(71) Applicant: UMF Corporation, Skokie, IL (US)

(72) Inventor: George Clarke, Skokie, IL (US)

(73) Assignee: UMF CORPORATION, Skokie, IL (US)

(*) Notice: Subject to any disclaimer, the term of this patent is extended or adjusted under 35 U.S.C. 154(b) by 0 days.

(21) Appl. No.: 16/422,607

(22) Filed: May 24, 2019

(51) Int. Cl.
*A47H 5/02* (2006.01)
*F16B 2/22* (2006.01)

(52) U.S. Cl.
CPC . *A47H 5/02* (2013.01); *F16B 2/22* (2013.01)

(58) Field of Classification Search
CPC .. A47H 5/02; A47H 5/00; A47H 19/00; F16B 2/00; F16B 2/02; F16B 2/10; A61G 10/005
USPC .............................. 160/349.1, 349.2
See application file for complete search history.

(56) References Cited

U.S. PATENT DOCUMENTS

| | | | | |
|---|---|---|---|---|
| 1,476,887 A * | 12/1923 | Heerey | ................ | A47H 19/00 24/457 |
| 1,482,874 A * | 2/1924 | Wait | ................ | E06B 9/78 24/116 A |
| 1,634,532 A * | 7/1927 | Bowe Denis E | ...... | A44B 99/00 24/503 |
| 1,654,002 A * | 12/1927 | Kleinhamer | ........... | A47H 19/00 160/349.2 |
| 1,909,109 A * | 5/1933 | Kopfstein | ................ | E06B 9/42 160/384 |
| 2,199,717 A * | 5/1940 | Thoms | ................ | A47H 19/00 160/349.2 |
| 2,211,982 A * | 8/1940 | O'Malley | ................ | E06B 9/78 160/384 |
| 2,250,469 A * | 7/1941 | Crow | ................ | A44B 99/00 24/536 |
| 2,261,005 A * | 10/1941 | Thompson | ............ | D06F 55/02 24/500 |
| 2,489,460 A * | 11/1949 | Nurenberg | ............... | E06B 9/78 24/129 B |
| 2,599,121 A * | 6/1952 | Miller, Jr. | ................ | E06B 9/78 160/384 |
| 3,087,219 A * | 4/1963 | Roberts | ................ | E06B 9/78 16/428 |
| 3,137,027 A * | 6/1964 | Birkle | ................ | A47H 13/01 16/87.2 |
| 3,214,810 A * | 11/1965 | Mathison | ................ | A41F 1/00 24/536 |
| 3,529,328 A * | 9/1970 | Davison | ............... | A47G 25/485 24/303 |
| 3,729,045 A * | 4/1973 | MacDonald | ............ | E06B 9/52 160/371 |

(Continued)

*Primary Examiner* — Johnnie A. Shablack
(74) *Attorney, Agent, or Firm* — Flener IP & Business Law; Zareefa B. Flener; Ayhan E. Mertogul

(57) ABSTRACT

A curtain pull comprises inner and outer surfaces, and first and second leaves each rotatably connected to the other along an edge by a connector. The first leaf comprises a first portion of the inner surface and a first portion of the outer surface and the second leaf comprises a second portion of the inner surface and a second portion of the outer surface. The curtain pull transforms by folding at the connector from an open state wherein the first and second portions of the inner surface are relatively rotated on the connector at a non-zero angle to a closed state wherein the first and second portions of the inner surface are opposed.

13 Claims, 11 Drawing Sheets

(56) References Cited

U.S. PATENT DOCUMENTS

| | | | | |
|---|---|---|---|---|
| 3,767,092 A * | | 10/1973 | Garrison | A47G 25/005 223/96 |
| D238,667 S * | | 2/1976 | Bero | D25/124 |
| 3,950,829 A * | | 4/1976 | Cohen | D06F 55/02 211/124 |
| 4,112,951 A * | | 9/1978 | Hulka | A61B 17/282 128/831 |
| 4,194,274 A * | | 3/1980 | Garrison | A47G 25/485 223/91 |
| 4,255,837 A * | | 3/1981 | Holtz | B42F 11/04 24/303 |
| 4,282,919 A * | | 8/1981 | Teno | E06B 9/17015 160/23.1 |
| 4,355,743 A * | | 10/1982 | Erthein | D06F 55/00 223/96 |
| 4,356,647 A * | | 11/1982 | Farris | G09F 15/02 40/661 |
| 4,534,089 A * | | 8/1985 | Swan | B42F 1/10 24/30.5 P |
| 4,536,924 A * | | 8/1985 | Willoughby | A44B 99/00 24/487 |
| 4,557,311 A * | | 12/1985 | Reining | E04F 10/02 160/330 |
| 4,716,634 A * | | 1/1988 | Fan | A47G 25/485 223/91 |
| 4,807,334 A * | | 2/1989 | Blanchard | A44B 99/00 223/91 |
| D316,334 S * | | 4/1991 | Duester | D6/326 |
| 5,007,144 A * | | 4/1991 | Terada | A44B 19/26 24/415 |
| 5,082,153 A * | | 1/1992 | Duester | A47G 25/485 223/90 |
| 5,148,581 A * | | 9/1992 | Hartmann | A44B 99/00 16/4 |
| 5,183,191 A * | | 2/1993 | Garrison | A47G 25/485 223/91 |
| 5,297,706 A * | | 3/1994 | Blitz | A47G 25/485 223/96 |
| 5,361,948 A * | | 11/1994 | Batts | A47G 25/485 223/91 |
| 5,388,313 A * | | 2/1995 | Cameron | A41F 3/04 24/265 EC |
| D365,017 S * | | 12/1995 | Rohrig | D8/394 |
| 5,495,628 A * | | 3/1996 | Logan | A47K 3/38 4/558 |
| 5,516,014 A * | | 5/1996 | Garrison | A47G 25/485 223/91 |
| 5,517,722 A * | | 5/1996 | Bender | A47H 19/00 16/87.2 |
| 5,682,653 A * | | 11/1997 | Berglof | G09F 1/10 24/303 |
| 6,047,868 A * | | 4/2000 | Petrou | A47G 25/485 223/91 |
| 6,101,689 A * | | 8/2000 | Jo | A45F 5/02 24/332 |
| 6,298,526 B1 * | | 10/2001 | Baumdicker | A44B 99/00 24/306 |
| 6,306,329 B1 * | | 10/2001 | Willinger | A47G 25/483 223/91 |
| 6,516,500 B2 * | | 2/2003 | Ogino | A41F 11/06 24/504 |
| 6,668,432 B2 * | | 12/2003 | Lewis | A41F 3/02 24/516 |
| 6,675,449 B2 * | | 1/2004 | Wales | A44B 99/00 24/559 |
| 6,705,380 B2 * | | 3/2004 | Scolletta | A47H 19/00 160/349.2 |
| 6,739,374 B1 * | | 5/2004 | Mouzakis | E06B 9/36 160/178.1 V |
| 7,066,494 B1 * | | 6/2006 | Di Prinzio | B42D 9/005 116/234 |
| 7,243,402 B2 * | | 7/2007 | Andersen | B60P 7/0807 24/517 |
| 7,299,957 B1 * | | 11/2007 | Sutton | A47G 25/485 223/91 |
| 7,989,046 B2 * | | 8/2011 | DiNunzio | A47H 23/10 160/237 |
| 8,028,381 B2 * | | 10/2011 | Murray | A47H 23/01 160/395 |
| D659,526 S * | | 5/2012 | Boucher-Gagne | A47G 25/485 D8/395 |
| 8,365,927 B2 * | | 2/2013 | Koziak | A47K 3/38 211/106.01 |
| 8,383,205 B2 * | | 2/2013 | Rosing | D06M 13/207 427/240 |
| D679,406 S * | | 4/2013 | Del Solar | D24/194 |
| 8,959,814 B2 * | | 2/2015 | Cook | G09F 15/0018 24/516 |
| 9,144,340 B2 * | | 9/2015 | Mayer | A47H 23/00 |
| 9,230,456 B2 * | | 1/2016 | Meyerson | G09F 3/0295 |
| 9,427,037 B1 * | | 8/2016 | Atherton | A41H 37/00 |
| 9,504,345 B2 * | | 11/2016 | Stibich | A61L 2/10 |
| 9,661,947 B2 * | | 5/2017 | Mayer | A47H 23/00 |
| D809,904 S * | | 2/2018 | Smith | B42F 1/10 D8/368 |
| 9,957,395 B2 * | | 5/2018 | Whiteford | A01N 43/90 |
| 2003/0056344 A1 * | | 3/2003 | Brogdon, III | A47K 10/14 24/564 |
| 2005/0257353 A1 * | | 11/2005 | Rohrig | A45F 5/02 24/537 |
| 2006/0252326 A1 * | | 11/2006 | Mishler | A01N 25/34 442/123 |
| 2007/0075104 A1 * | | 4/2007 | Yau | A47G 25/485 223/85 |
| 2008/0011434 A1 * | | 1/2008 | Tascoe | A47H 19/00 160/349.2 |
| 2009/0044888 A1 * | | 2/2009 | Ganey | A47H 21/00 150/154 |
| 2012/0048486 A1 * | | 3/2012 | Howarth | A47H 19/00 160/368.1 |
| 2012/0138245 A1 * | | 6/2012 | Affonso | A47H 19/00 160/349.2 |
| 2012/0222826 A1 * | | 9/2012 | Foss | D01F 1/103 160/237 |
| 2014/0115830 A1 * | | 5/2014 | Sharpe | A47H 5/02 16/422 |
| 2015/0291321 A1 * | | 10/2015 | Ecker | B65D 33/1674 24/30.5 R |
| 2015/0327706 A1 * | | 11/2015 | Harter | A47H 21/00 160/126 |
| 2016/0250363 A1 * | | 9/2016 | Stibich | A61L 2/10 250/492.1 |
| 2017/0224146 A1 * | | 8/2017 | Mayer | A47H 23/00 |
| 2017/0360236 A1 * | | 12/2017 | Walters | A47H 19/00 |
| 2018/0014681 A1 * | | 1/2018 | Stibich | A61L 2/10 |
| 2018/0177321 A1 * | | 6/2018 | Heidsiek | A61G 10/00 |
| 2018/0279818 A1 * | | 10/2018 | Goelst | A47H 21/00 |

* cited by examiner

US 10,722,062 B1

CURTAIN PULL

FIELD OF THE INVENTION

The present invention relates to curtain pulls having broad spectrum antimicrobial properties, including anti-bacterial, anti-fungal, and anti-viral (anti-BFV) efficacy, for use with patient and resident room privacy curtains in hospitals, medical clinics, and long-term care facilities.

BACKGROUND OF THE INVENTION

Hospital associated infections (HAI's) are a significant concern in the care of hospitalized patients. In 2014, the New Journal of Medicine published the results of the U.S Center for Disease Control's HAI Prevalence Study project. Per the study results, there were an estimated 722,000 HAIs in U.S acute care hospitals, affecting approximately one in 25 hospitalized patients, and an estimated 75,000 HAI-related deaths from hospitalized patients. According to a study published in the Journal of Medical Economics the societal impact of HAI's in acute care hospitals in the USA is estimated at $147 billion annually. HAI's typically result in longer hospital stays and aggressive treatment of HAI's with antibiotics increases the resistance of multidrug resistant organisms.

The majority of HAI's are preventable (pHAI). Steps can be taken to control and prevent HAI's in a variety of settings. The CDC's Guidelines for Environmental Control in Health-Care Facilities includes recommendations on appropriate use of hospital-grade, EPA-registered cleaners and disinfectants, and cleaning and disinfecting high-touch surfaces, e.g., doorknobs, bed rails, light switches, and surfaces in and around patient room toilets, on a more frequent cleaning schedule.

The present invention seeks to further address the issue of pHAI control and prevention through advanced design of common hospital room furnishings and methods for scheduling and tracking the cleaning and disinfection of high-touch surfaces. Privacy curtains in hospital rooms are often used to divide larger spaces into individual patient areas or cubicles and also, simply to provide privacy. Studies show that curtains can become contaminated with drug resistant organisms rapidly. Pathogens are transmitted to and from the privacy curtains through airborne transmission and physical contact by healthcare providers, visitors, and patients themselves. Some curtains are treated with anti-microbial chemicals to reduce pathogen transmission. These treatments are generally effective against some bacteria, but are not anti-viral, efficacy declines over time with washing and these chemical leach into the environment. Further, the advent of applications that run on smart phones and other hand-held devices that can communicate with a database of scheduling information provides an opportunity to effectively track and schedule regular cleaning routines of the high-touch surfaces.

SUMMARY OF THE INVENTION

According to one aspect of the invention, a curtain pull comprises inner and outer surfaces, and first and second leaves each rotatably connected to the other along an edge by a connector. The first leaf comprises a first portion of the inner surface and a first portion of the outer surface and the second leaf comprises a second portion of the inner surface and a second portion of the outer surface. The curtain pull transforms by folding at the connector from an open state wherein the first and second portions of the inner surface are relatively rotated on the connector at a non-zero angle to a closed state wherein the first and second portions of the inner surface are opposed.

According to another aspect of the invention, a curtain pull comprises inner and outer surfaces, and first and second leaves each rotatably connected to the other along an edge by a connector. The first leaf comprises a first portion of the inner surface and a first portion of the outer surface and the second leaf comprises a second portion of the inner surface and a second portion of the outer surface. At least one of the first and second portions of the inner surface comprises at least a first curtain gripping element. The curtain pull transforms by folding at the connector from an open state wherein the first and second portions of the inner surface are relatively rotated on the connector at a non-zero angle to a closed state wherein the first and second portions of the inner surface are opposed.

According to yet another aspect of the invention, a curtain pull comprises inner and outer surfaces, and first and second leaves each rotatably connected to the other along an edge by a connector. The first leaf comprises a first portion of the inner surface and a first portion of the outer surface, and the second leaf comprises a second portion of the inner surface and a second portion of the outer surface. At least one of the first and second portions of the inner surface comprises at least a first curtain gripping element. The curtain pull transforms by folding at the connector from an open state wherein the first and second portions of the inner surface are relatively rotated on the connector at a non-zero angle to a closed state wherein the first and second portions of the inner surface are opposed. A lock mechanism engages the first and second portions of the outer surface in a closed state.

DETAILED DESCRIPTION OF THE DRAWINGS

Figure 1A:
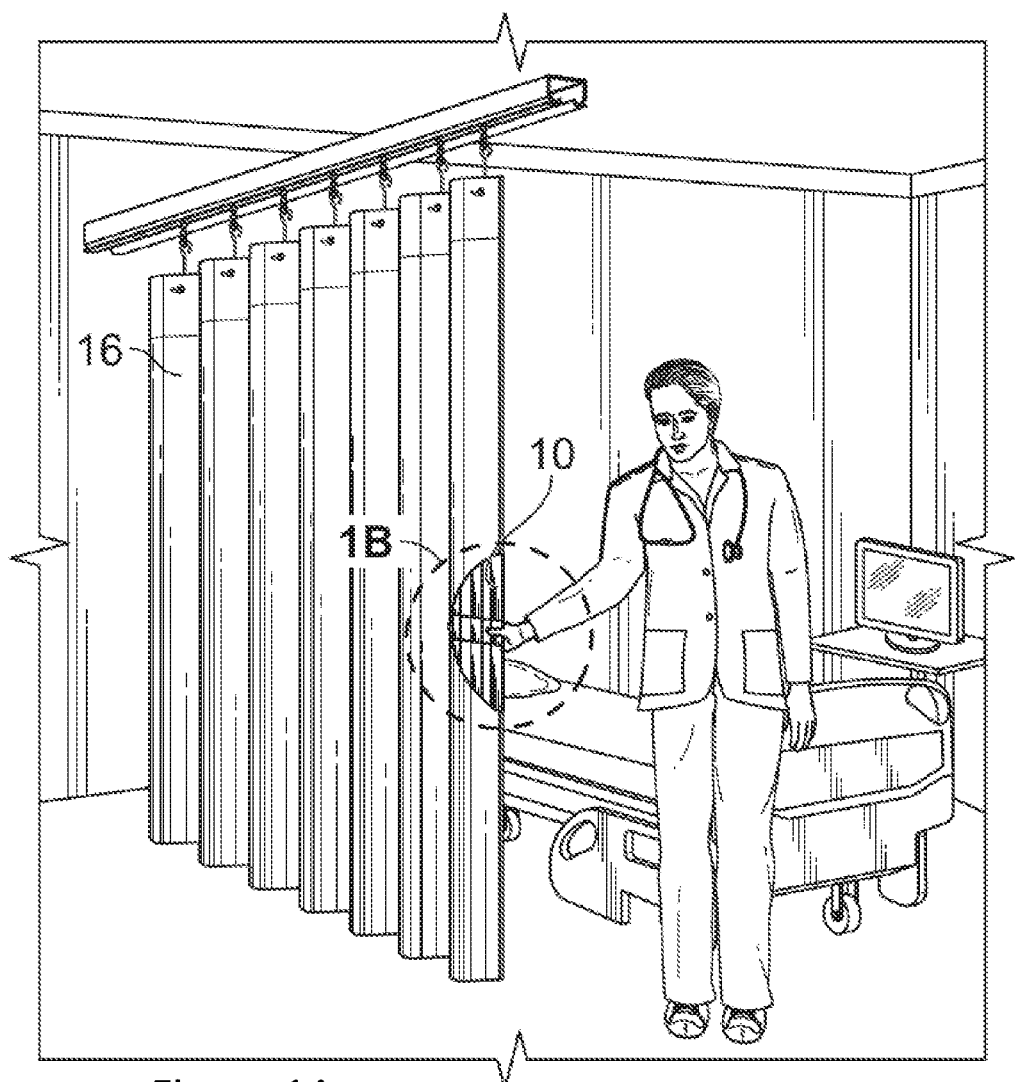
FIG. 1A is a perspective view of an embodiment of a curtain pull disposed in a closed state on a hospital privacy curtain.
Figure 1B:
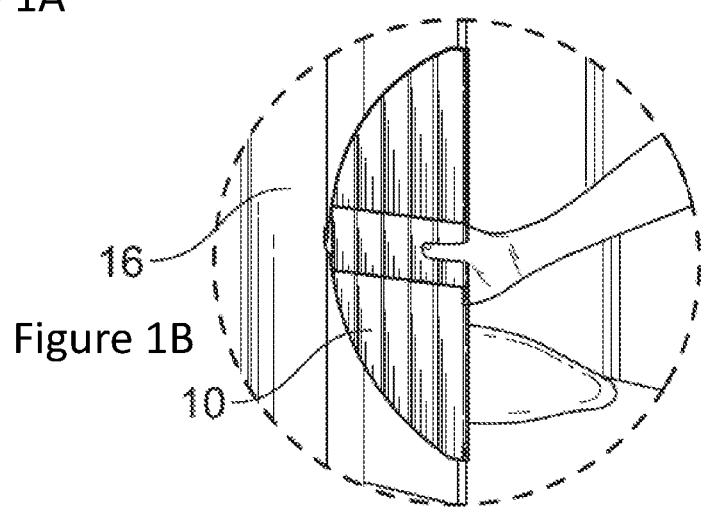
FIG. 1B is a close up perspective view of a portion of the embodiment shown in FIG. 1A.

FIGS. 1A and 1B illustrate an embodiment of a curtain pull 10 in the context of an exemplary environment for use thereof. FIG. 1A illustrates for example, a hospital room having a privacy curtain 16 that can be drawn across the room to provide privacy with a bed disposed behind the privacy curtain 16. The privacy curtain 16 includes the curtain pull 10 that is shown being grasped by a hospital worker in both FIGS. 1A and 1B, where FIG. 1B provides a close-up view of the curtain pull 10 disposed on the privacy curtain 16.

The curtain pull 10 is comprised at least in part of a rechargeable anti-bacterial, anti-fungal, and anti-viral (anti-BFV) adjuvant chemistry infused throughout the material of the curtain pull 10. The rechargeable anti-BFV capability is infused throughout the material of the curtain pull 10 by adding chemistry in the form of a polymer master batch to the polymer that the curtain pull 10 is made from. In one embodiment, for example without limitation, the curtain pull 10 is injection molded and the polymer master batch is added to the polymer the curtain pull 10 is injection molded from. In other embodiments the curtain pull 10 is made from other methods as known in the art and the polymer master batch is added to the polymer the curtain pull 10 is made from.

The anti-BFV adjuvant chemistry infused throughout the material of the curtain pull 10 is capable of binding chlorine molecules across the entire surface of the curtain pull. Though the rechargeable anti-BFV capability is infused throughout the material of the curtain pull 10 during manufacture, the material of the curtain pull 10 has no inherent anti-BFV properties until chlorine molecules are bound to the surface. The chlorine molecules are provided by a chlorine containing cleaner/disinfectant when the curtain pull 10 is wiped, cleaned, and/or disinfected.

One exemplary anti-BFV material additive is a sterically hindered N-Halo-amine (SHH). An SHH, such as a sterically hindered chloramine (SHC) can be formed by the halogenation, e.g., chlorination of an SHH. SHC's are found to have potent, durable, and rechargeable antimicrobial activities against both gram-negative and gram-positive bacteria and have shown to be effective against a variety of pathogens, including, bacteria, virus, spores, fungi, bacteria phase and combinations thereof. The curtain pull 10 is generally composed of medical-grade polymer, for example polyamide, or similar polymer material, and the anti-BFV polymer chemical composition is introduced to the curtain pull components through a master batch additive (MB) process as described above. Additional processes for manufacture of SHC's and introduction thereof in polymeric materials are disclosed in U.S. Pat. No. 7,541,398, licensed by the present applicant, the contents of which are incorporated herein by reference in their entirety.

The chemical structure of the SHH enables the curtain pull's rechargeable surface, such as the outer and inner surfaces 12, 14 or a portion thereof, to be recharged through cleaning with a chlorine containing cleaning and/or disinfectant product. With this type of rechargeable surface, chlorine first bonds to the outer surface 12 (and/or inner surface 14) of the curtain pull during the first cleaning/disinfecting process. When bacterial, fungal, or viral pathogens (BFV) encounter the chlorinated surface, they are killed, and the chlorine is consumed. The chlorine-based cleaning process will recharge the surface so that additional BFV encountering the surface are killed and the chlorine is again consumed. Other suitable anti-BFV materials may be substituted for the sterically hindered N-Halo-amine, and the specific sterically hindered chloramine disclosed herein.

Figure 2:
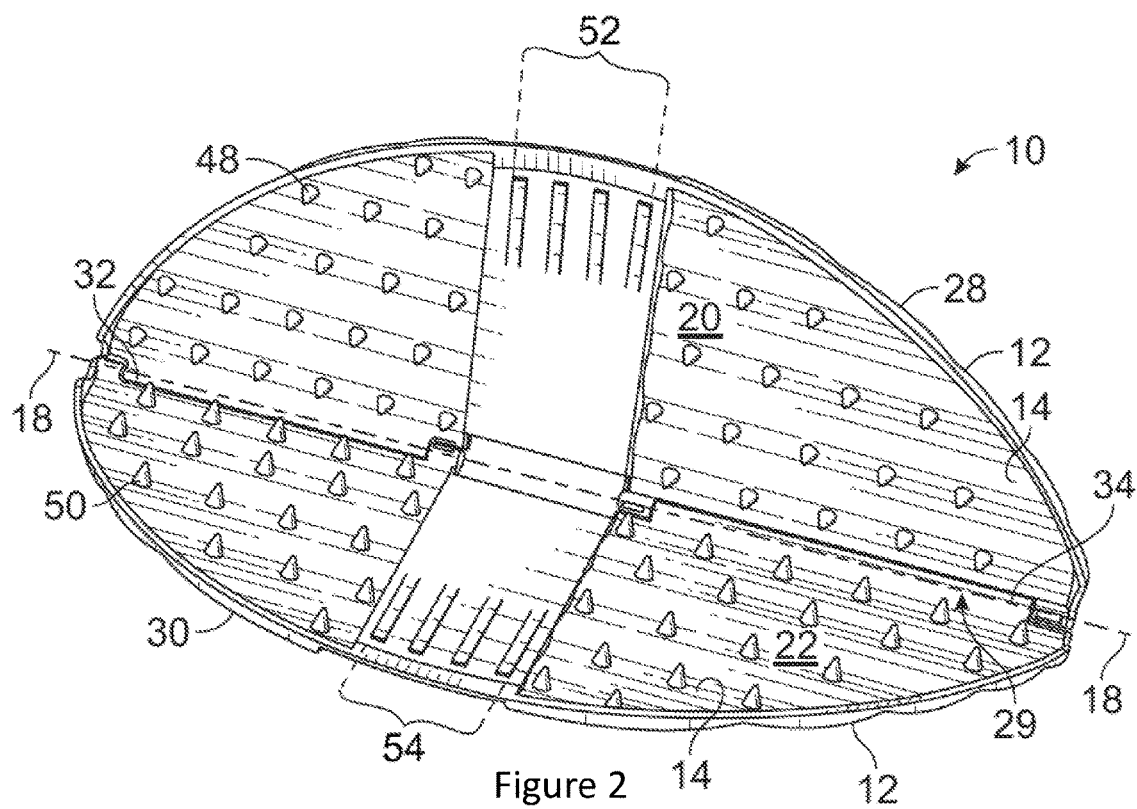
FIG. 2 is a perspective view of an embodiment of the curtain pull in an open state.
Figure 3:
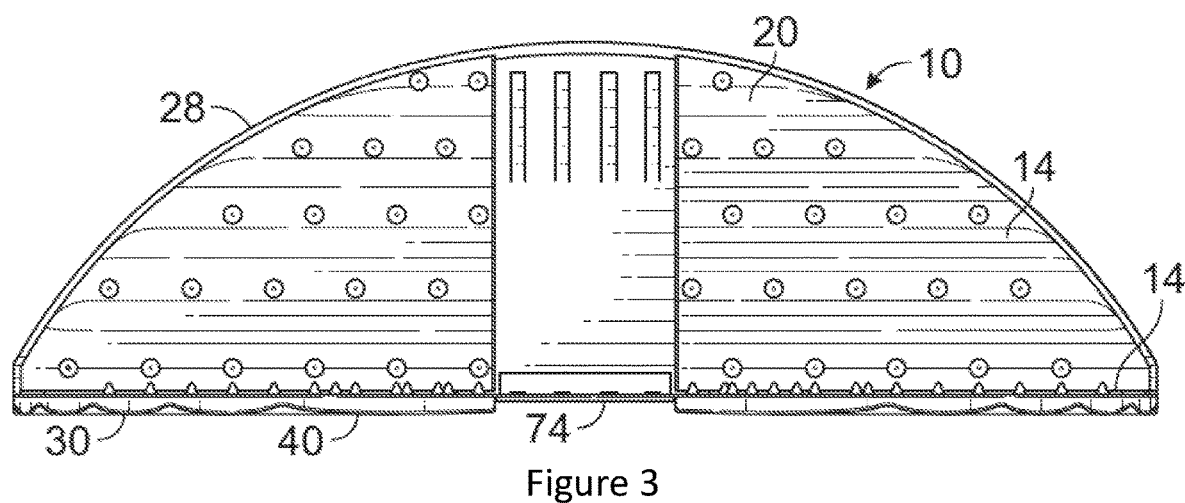
FIG. 3 is a plan view of the inner surface of the curtain pull of FIG. 2 in an open state.
Figure 4:
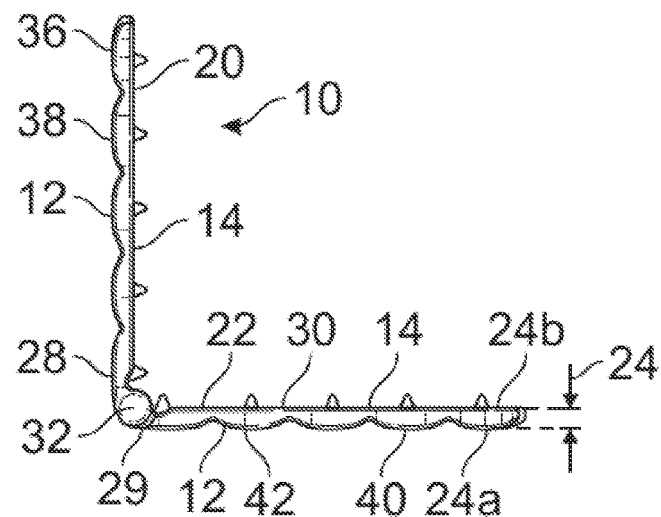
FIG. 4 is a side view of the curtain pull of FIG. 2 in an open state.
Figure 5:
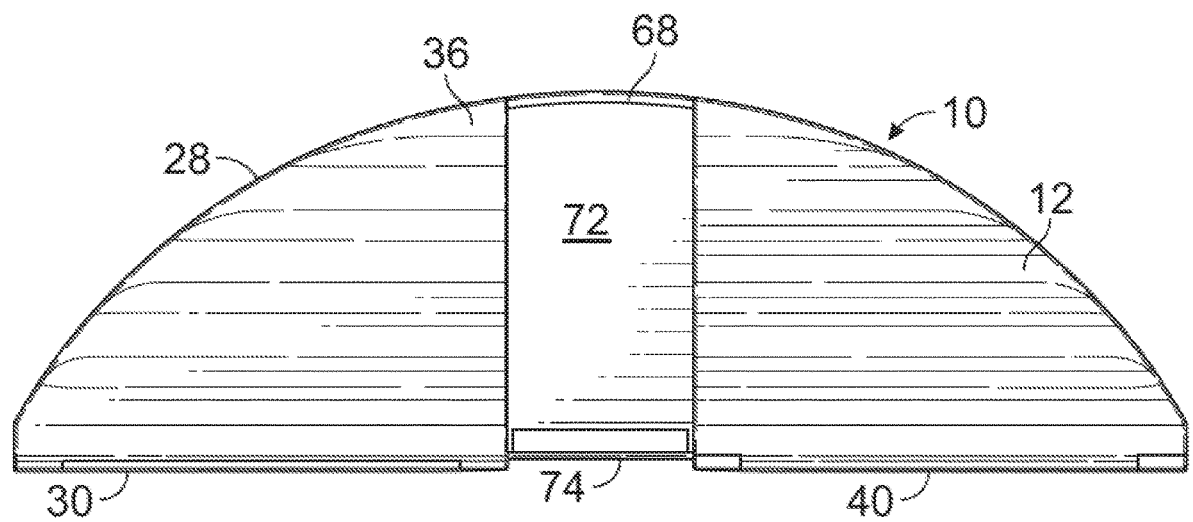
FIG. 5 is a plan view of the outer surface of the curtain pull of FIG. 2.
Figure 6A:
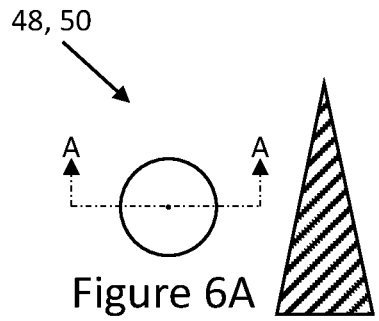
FIG. 6A thru 6G are top plan and cross-sectional views of exemplary curtain gripping elements.
Figure 6B:
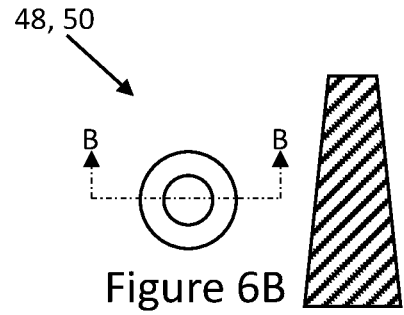
Figure 6C:
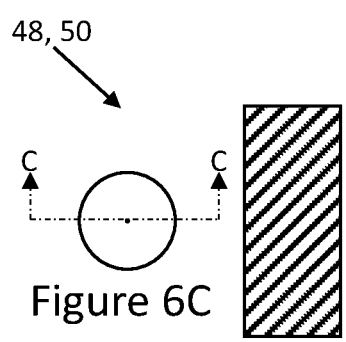
Figure 6D:
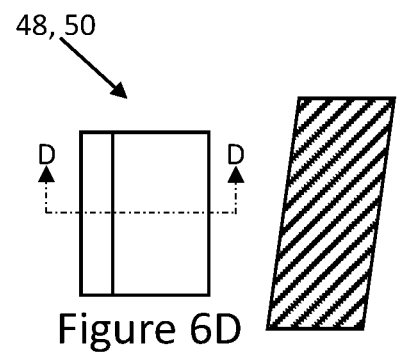
Figure 6E:
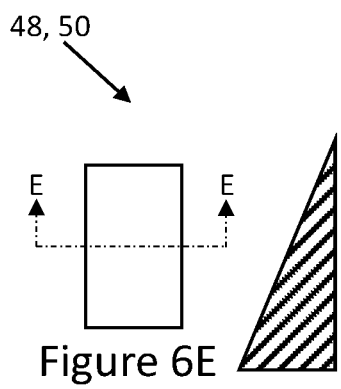
Figure 6F:
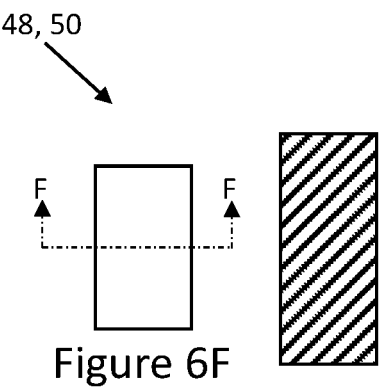
Figure 6G:
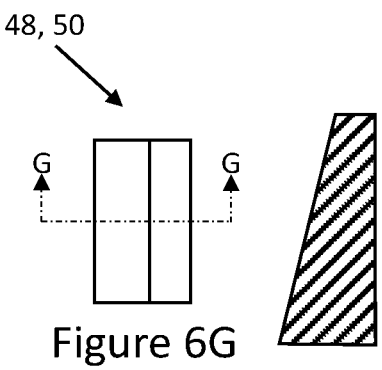

Referring to FIGS. 2-5, the curtain pull 10 is illustrated to have a clamshell shape having first and second leaves 28, 30 disposed on opposite sides of centerline 18 shown in FIG. 2. The first and second leaves 28, 30 are connected along the centerline 18 by a connector 29. The curtain pull 10 has an outer surface 12, an inner surface 14, and is transformable from a first, open state (FIGS. 2-4) to a second, closed state (FIG. 5). In the closed state, the curtain pull 10 may be securely attached to the hospital privacy curtain 16. In the open state first and second portions of the inner surface 20, 22 are relatively rotated on the connector 29 at a non-zero angle so that the curtain pull 10 (FIGS. 2-4) is ready to be aligned with and grip the hospital privacy curtain 16. In the closed state (FIG. 5), the curtain pull 10 releasably engages the hospital privacy curtain 16 and provides a touch surface for opening and closing the curtain 16. In the closed state, the first and second leaves 28, 30 of the curtain pull 10 fold onto one another about the center line 18 along the connector 29 so that a first inner surface portion 20 opposes a second inner surface portion 22.

As illustrated in FIG. 4, the outer surface 12 of the curtain pull 10 can be more particularly described as first outer surface 36 on the first leaf 28 and second outer surface 40 on the second leaf 30. The outer surface 12 may further comprise a recessed area 72, 74 disposed on each of the first and second outer surfaces 36, 40, respectively, as shown in FIGS. 3, 5, 7, 9, and 15 for accommodating a lock mechanism 56 described hereinbelow with regard to FIGS. 12-16.

The curtain pull 10 can be secured over a predetermined area of the curtain 16 so that the curtain pull 10 covers the area where the curtain 16 would otherwise be touched by healthcare providers, visitors, and the patients themselves in an attempt to open or close the curtain 16. The curtain pull 10 provides a surface that inhibits the spread of pathogens responsible for pHAIs while allowing the curtain 16 to be manipulated with ease. The curtain pull 10 inhibits the spread of organisms responsible for pHAIs by providing the rechargeable anti-BFV surface as described above. The anti-BFV surface is recharged when cleaned and disinfected using a cleaner/disinfectant containing chlorine as the active ingredient.

Referring to FIG. 4, the curtain pull 10 comprises a first thickness 24 measured between the outer surface 12 and the inner surface 14. Because the rechargeable anti-BFV capability is infused throughout the curtain pull 10 by adding chemistry in the form of a polymer master batch to the polymer that the curtain pull 10 is made from, in a first embodiment of the curtain pull 10 the entire outer surface 12, the entire inner surface 14, and the entirety of the first thickness 24 include the anti-BFV polymer chemical composition that is rechargeable by cleaning or disinfecting. In a second embodiment, only a portion of the outer surface 12 and/or the inner surface 14 is covered by a material layer made using the rechargeable anti-BFV polymer chemical composition. In another embodiment, the curtain pull 10 is made from another material in addition to the material containing the anti-BFV polymer chemical composition so in this embodiment only the portion of the curtain pull 10 containing the anti-BFV polymer chemical composition is configured with regard to the outer and inner surfaces 12 and 14 and the first thickness 24 as described in the first and second embodiments of the curtain pull 10 described hereinabove.

Figure 7:
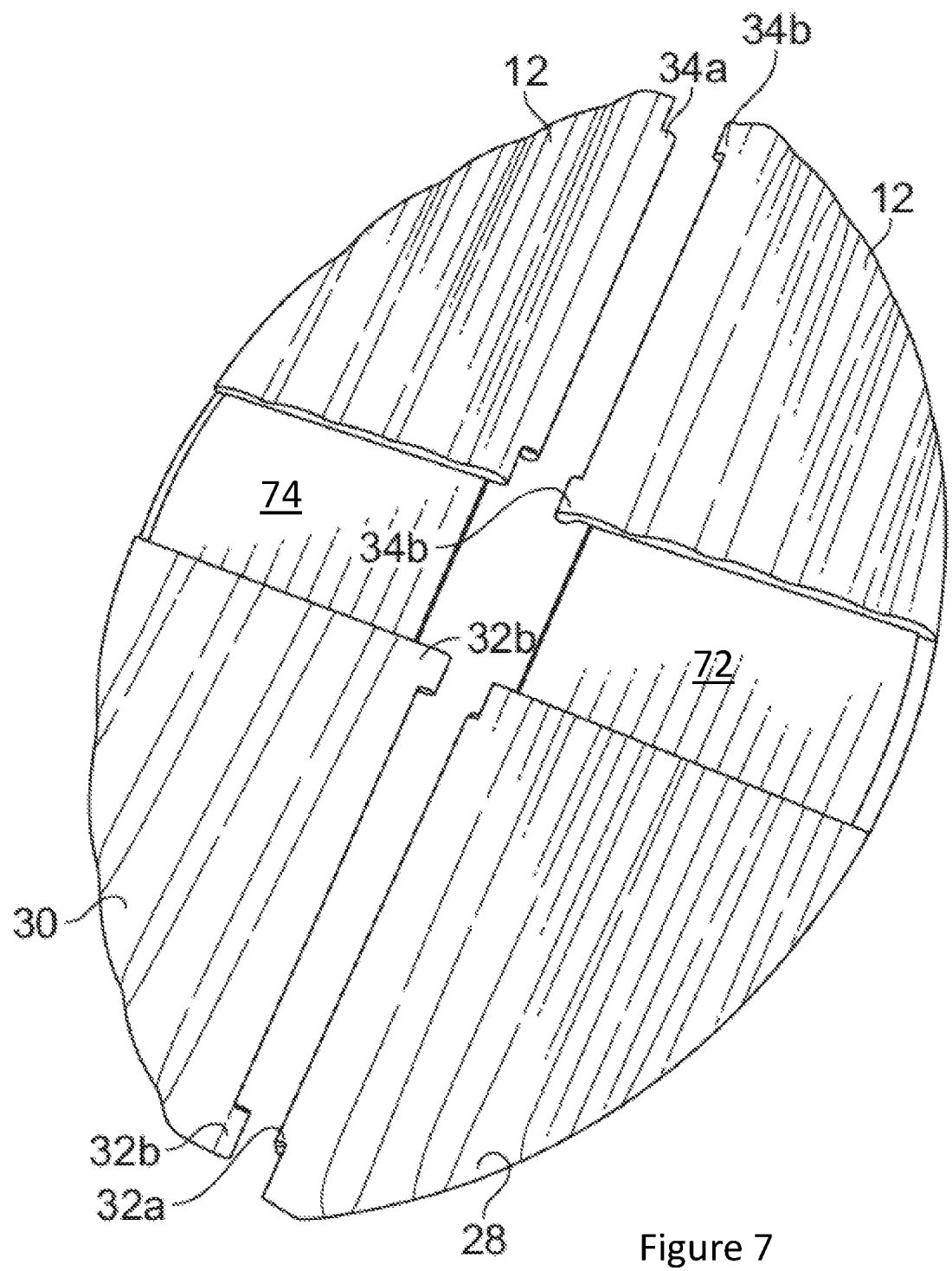
FIG. 7 is a perspective view of the outer surface of an embodiment of the curtain pull with the connector separated.
Figure 8:
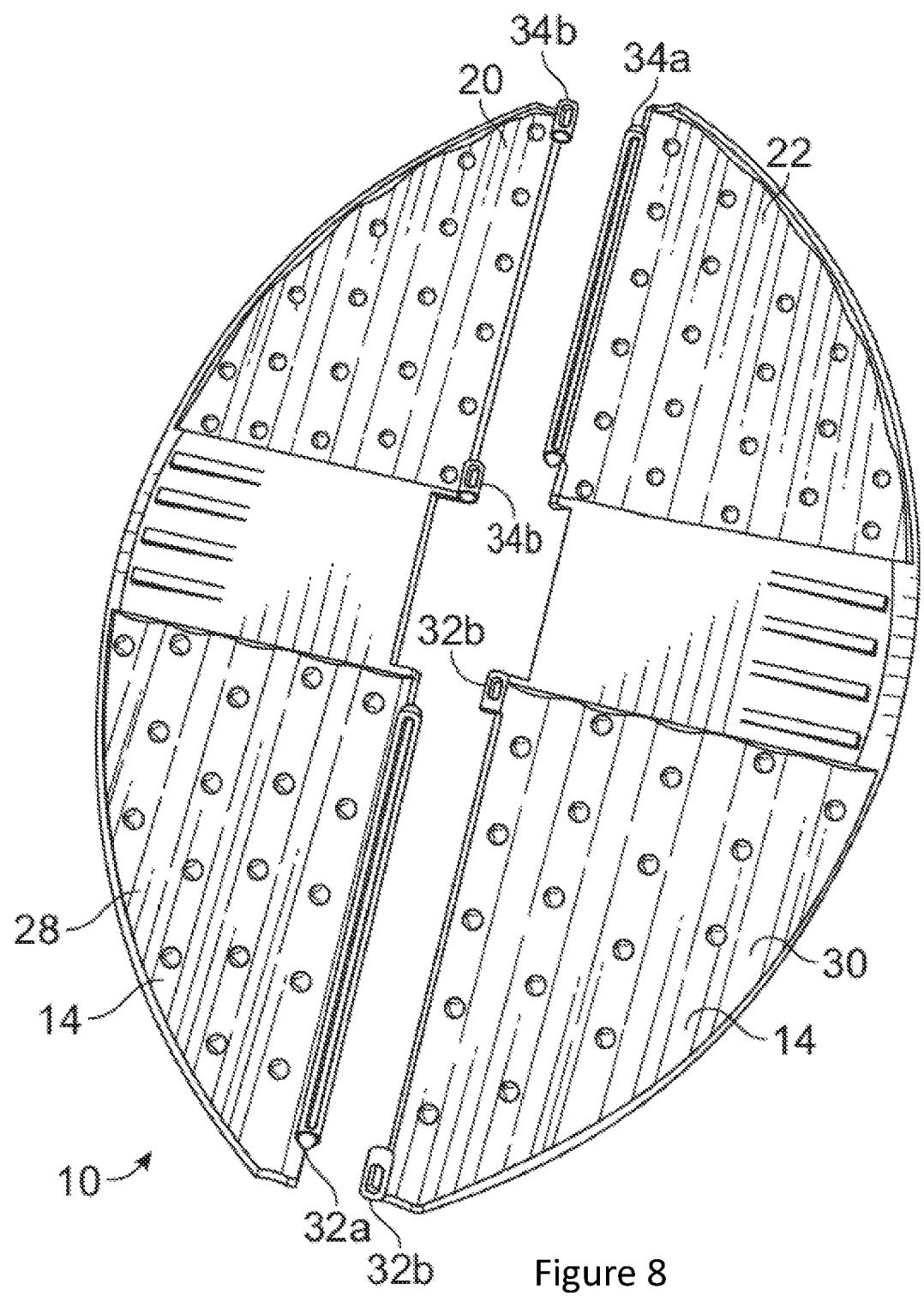
FIG. 8 is a perspective view of the inner surface the curtain pull of FIG. 6 with the connector separated.
Figure 9:
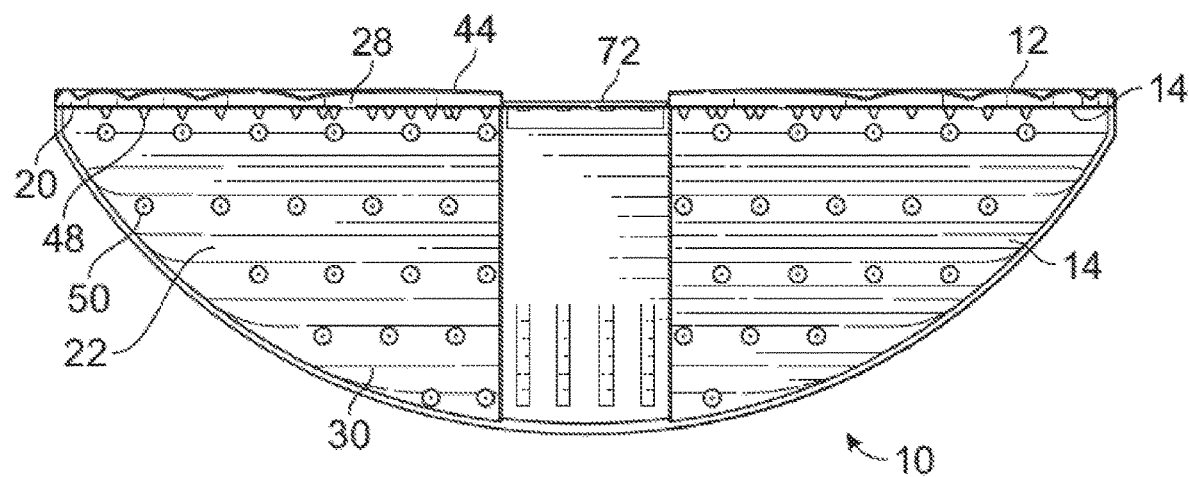
FIG. 9 is another plan view of the inner surface of the curtain pull of FIG. 2 in an open state.

Referring back to FIG. 2, the curtain pull 10 includes the first and second leaves 28, 30 connected along the centerline 18 by the connector 29. The connector 29 comprises, for example, a first and a second hinge 32, 34. In one embodiment as shown in FIGS. 7 and 8, the first hinge 32 comprises a first portion 32a on the first leaf 28 and a second portion 32b on the second leaf 30. Similarly, the second hinge 34 comprises a first portion 34a on the second leaf 30 and a second portion 34b on the first leaf 28. The first and second portions 32a and 32b of the first hinge 32 releasably engage to complete the first hinge 32. The first and second hinge portions 34a and 34b of the second hinge 34 releasably engage to complete the second hinge 34.

To simplify manufacture and assembly, the first and second leaves 28, 30 may in some embodiments be the same component that is simply rotated 180 degrees to line up the first and second hinges 32, 34. Accordingly, the first portion 32a of the first hinge 32 on the first leaf 28 is identical in structure to the first portion 34a of the second hinge 34 on the second leaf 30. Similarly, the second portion 32b of the first hinge 32 the on the second leaf 30 is identical in structure to the second portion 34b of the second hinge 34 on the first leaf 28.

The first and the second hinges 32, 34 are shown in FIGS. 7 and 8 to be integrally formed with the leaves 28, 30. In another embodiment, the first and the second hinges 32, 34 can be separate components affixed to the first and second leaves 28, 30 during manufacture of the curtain pull 10. In yet another embodiment, the first and second leaves 28, 30 may be formed as a single unit, commonly known as a living hinge, with the leaves 28, 30 where the connector 29 is a thinner web portion (not shown). The connector 29 enables the first and second leaves 28, 30 to fold upon each other.

In one embodiment, at least a portion of the outer surface 12 includes a grip contour or grip texture 38, 40 which is best seen in FIG. 4. For example without limitation, in one embodiment, the grip contour 38 comprises at least a first wave or undulation providing a texture for a user to grip the curtain pull 10. Other embodiments have at least a portion of the outer surface 12 that is flat and lacking a grip contour or grip texture 38, 40.

Referring again to FIG. 2, on at least one of the first and second inner surface portions 20 and 22 is disposed at least a first curtain gripping element 48 and 50, respectively. In one embodiment, a plurality of curtain gripping elements 48, 50 is disposed on at least one of the first and second inner surface portions 20, 22. In the embodiment of FIGS. 2-4 the curtain gripping elements 48, 50 are shown to be conical protuberances. However, in other embodiments, the curtain gripping elements 48, 50 may be, for example without limitation, frusto-conical protuberances, cylindrical protuberances, gripping ramp elements, or tabs or protrusions extending from the inner surface 14 and having any shape suitable for nesting or interlocking together for gripping the material of the curtain 16 as may be known in the art. Some exemplary shapes without limitation for the curtain gripping elements 48, 50 are illustrated in FIG. 6A thru 6G. On the left side of each of the FIG. 6A thru 6G is shown the top plan view of the embodiment of the curtain gripping element 48, 50. A cross-sectional view of each of the curtain gripping elements 48, 50 taken along the lettered dashed lines labeled A-A thru G-G is shown on the right side of each of the FIG. 6A thru 6G. Stepping thru these examples without limitation thereto, the curtain gripping elements 48, 50 may be conical in shape (see 6A), frustoconical in shape (see 6B), cylindrical in shape (see 6C), an angled rectangular block (see 6D), a gripping ramp element having a pointed top (see 6E), a straight rectangular block (see 6F), or a gripping ramp element having a flat top (see 6G). In addition, any of the described shapes can have base shapes or top surfaces of other polygons than those shown in any of the Figures herein.

Figure 10:
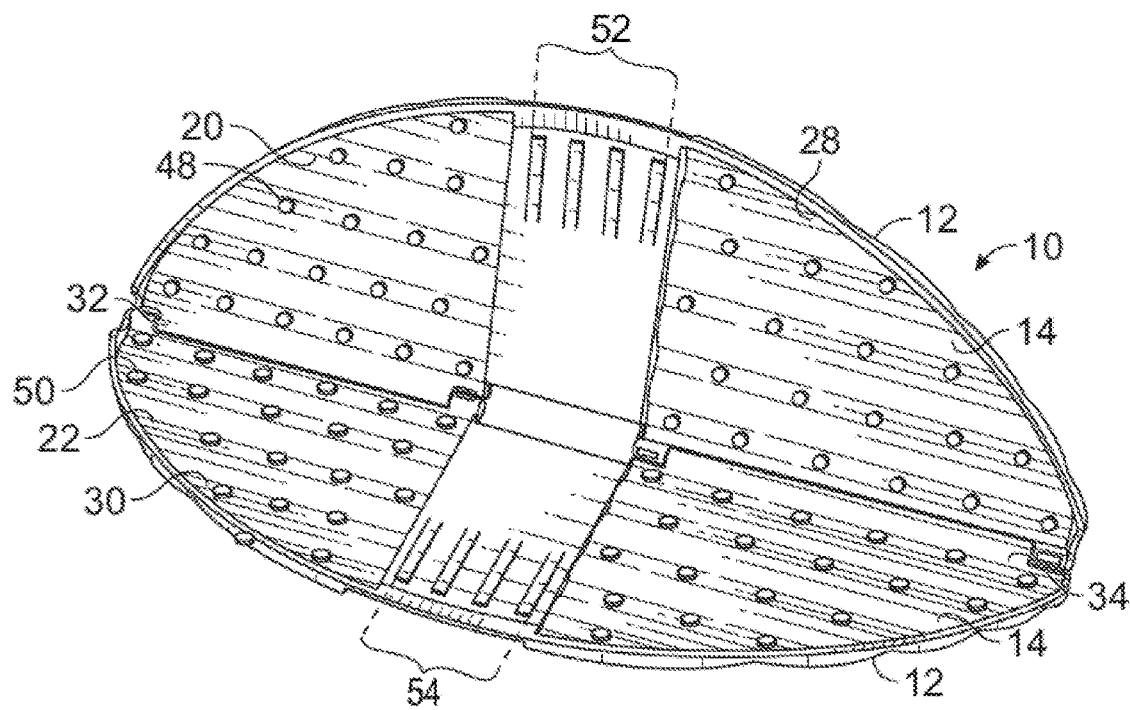
FIG. 10 is a perspective view of another embodiment of the curtain pull in an open state.
Figure 11:
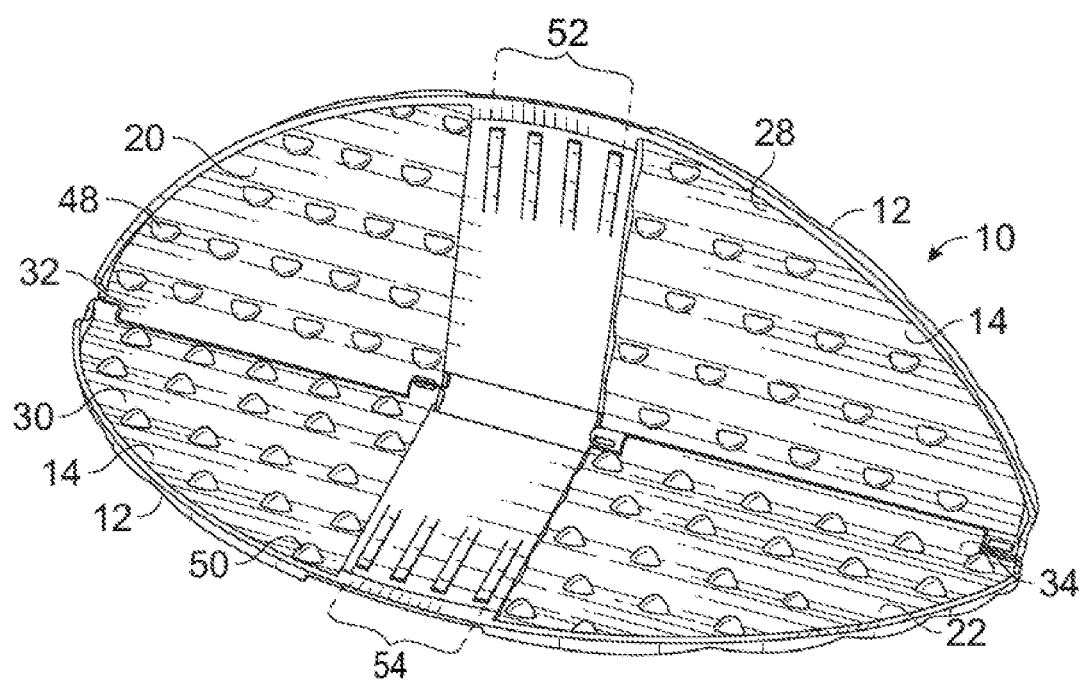
FIG. 11 is a perspective view of yet another embodiment of the curtain pull in an open state.

In another embodiment, for example as shown in FIG. 10, the gripping elements 48, 50 comprise magnets. Opposing magnets 48, 50 on the first and second inner surface portions 20, 22 are of opposite polarity and are aligned to attract and engage when the curtain pull 10 is in the second, closed state. In a further embodiment, the first and second inner surface portions 20, 22 may further comprise a plurality of ramp elements 52, 54 as can be seen in FIGS. 10 and 11 aligned to nest and interlock when the curtain clamp 10 is in the second, closed state.

Figure 14:
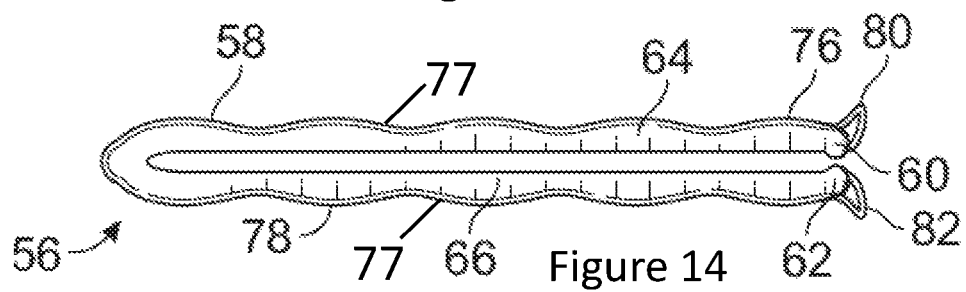
FIG. 14 is a side view of the locking mechanism of FIG. 11.
Figure 15:
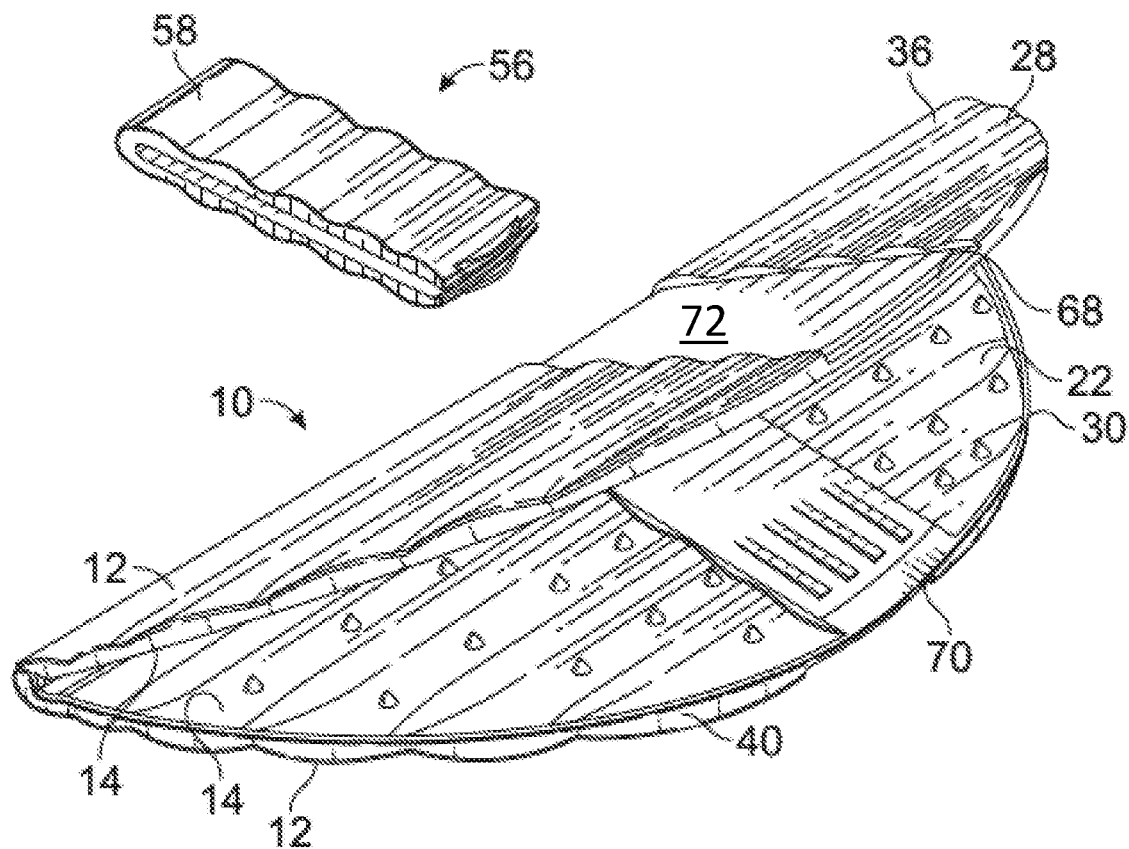
FIG. 15 is an exploded perspective view of the locking mechanism of FIG. 11 before application to an embodiment of the curtain pull.

Referring to FIGS. 12-16, a lock mechanism 56 is shown in one embodiment having an exterior surface 77. The lock mechanism 56 is designed to secure the curtain pull 10 in the second, closed state and may in one embodiment be in the form of a clasp 58. The clasp 58 may be any shape, for example, generally U-shaped with a first and second locking lip 60, 62 at the end of each leg 64, 66. Referring to FIG. 15, the first and second locking lips 60, 62 correspond to and releasably engage first and second ridges 68, 70 on the first and second outer surface portions 36, 40 of the curtain pull 10. As shown in FIGS. 3, 5, 7, 9, and 15, the first and second outer surface portions 36, 40 each include a recessed area 72, 74, respectively, terminating at the first and second ridges 68, 70 to form a receiving space for the clasp 58 when in engagement with the curtain pull 10. In operation, the clasp 58 slides over the folded first and second leaves 28, 30 in the recessed areas 72, 74 until the first and second locking lips 60, 62 move over the first and second ridges 68, 70 (see FIGS. 15 and 16). The thickness of the curtain 16 combined with the thickness of the leaves 28, 30 results in a press or friction fit of the clasp 58 installed onto the curtain pull 10.

Figure 12:
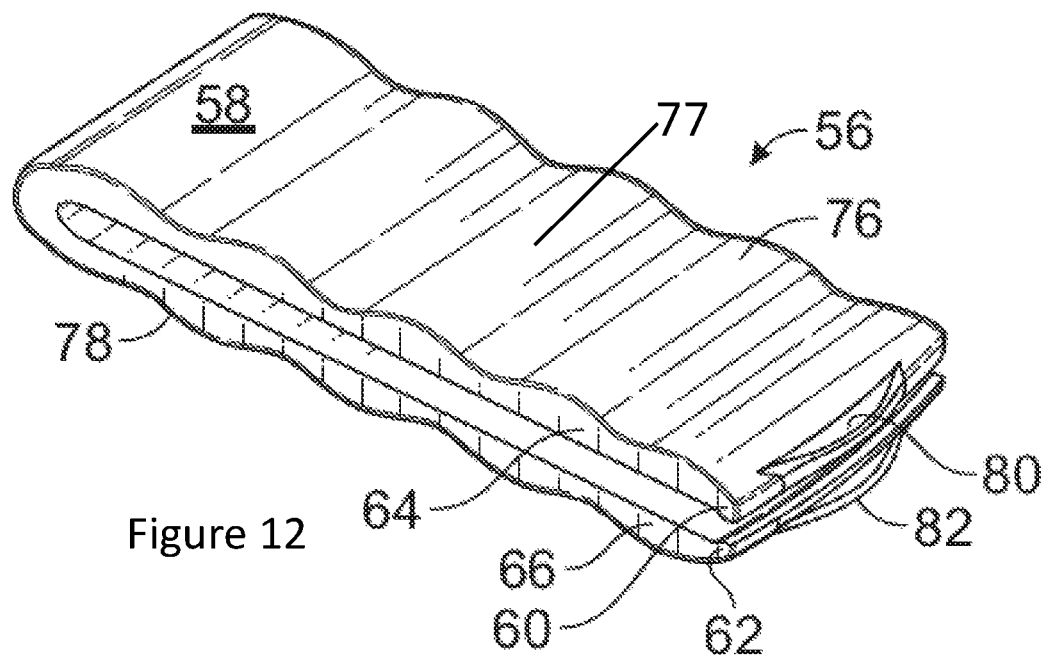
FIG. 12 is a perspective view of an embodiment of a locking mechanism.
Figure 13:
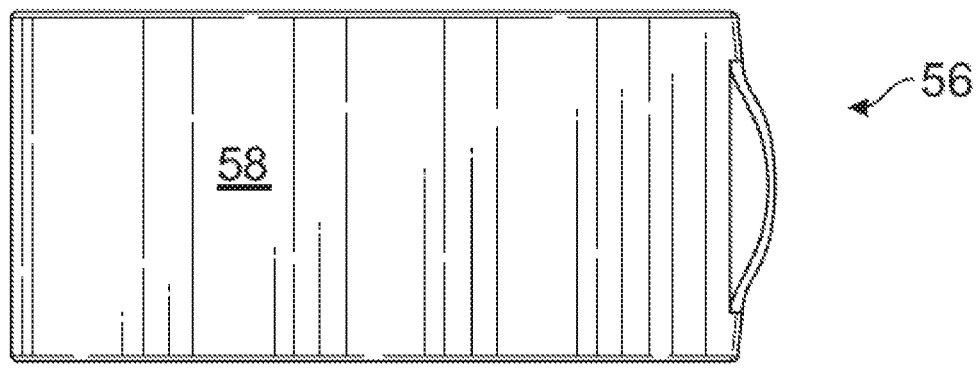
FIG. 13 is a plan view of the locking mechanism of FIG. 11.
Figure 16:
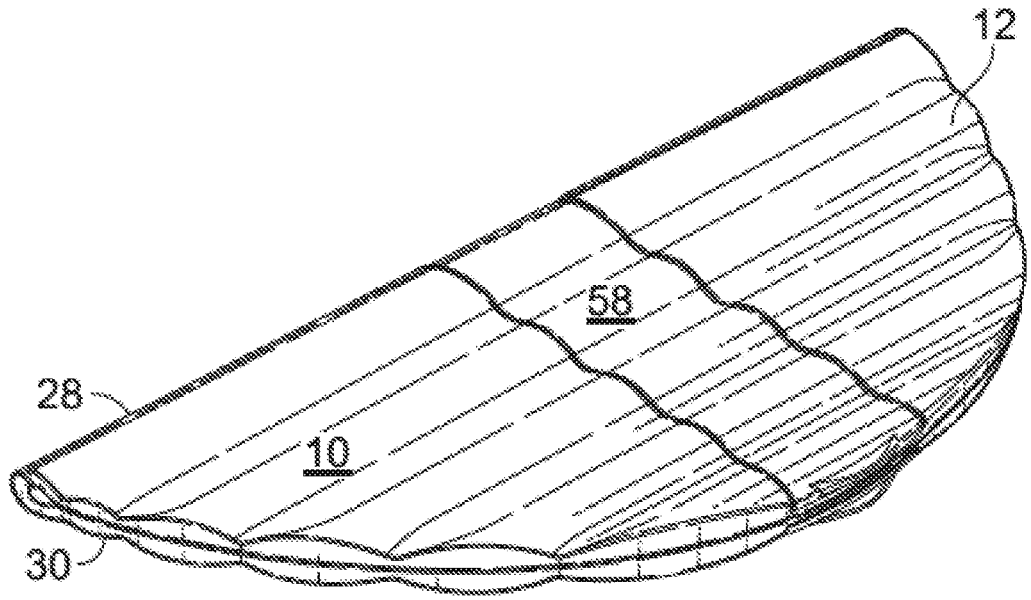
FIG. 16 is a perspective view of the locking mechanism of FIG. 11 disposed on the curtain pull of FIG. 14.
Figure 17:
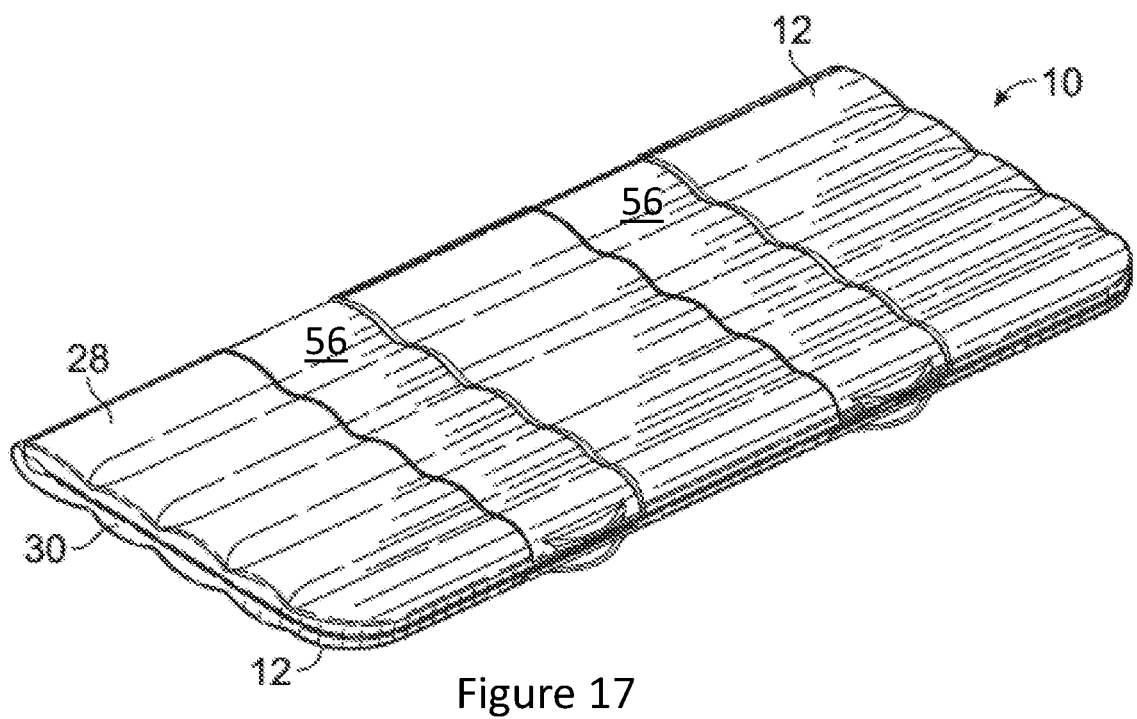
FIG. 17 is a perspective view of another embodiment of two locking mechanism disposed on a further embodiment of the curtain pull.

Referring to FIGS. 12 and 14, the clasp 58 in some embodiments may also incorporate a grip contour and/or texture 76, 78 on an exterior surface 77 thereof, wherein the grip contour and/or texture 76, 78 may be the same or different from the grip contour and/or grip texture 38, 40 as described hereinabove for the outer surface 12. For example, when the grip contour or texture 76, 78 on the clasp 58 is the same as the grip contour or texture 38, 40 of the outer surface 12, the assembled curtain pull 10 and clasp 58 will form a continuous surface contour. To further aid in the placement and manipulation of the clasp 58, in some embodiments, clasp tabs 80, 82 are disposed at the ends of the clasp legs 64, 66. The embodiment of the invention shown in FIGS. 15 and 16 shows use of a single lock mechanism 56, centrally located on the curtain pull 10. However, as shown in FIG. 17, two (or more) spaced lock mechanisms 56 may also be utilized to further secure the curtain pull 10 in position.

The lock mechanisms 56, and more specifically the clasps 58 shown in FIGS. 12-16 may be composed entirely or in part of the same medical-grade polymer, or similar material, impregnated with the adjuvant chemical composition as is used in the curtain pull 10 as described hereinabove. In one embodiment at least a portion of an exterior surface of the lock mechanism 56 comprises the anti-BFV material.

To increase durability the lock mechanism 56 may also be composed of a polyamide with a glass fiber component, where the glass fiber component may comprise in some embodiments any percentage ranging from 1% to in excess of 30% by weight, while in other embodiments may be less than 30% by weight, and may be for example, between 10% to 30% by weight, or between 15% and 25% by weight. When the locking mechanism 56 is formed using a polyamide and glass fiber material, the anti-microbial and anti-viral capability is introduced to the preformed lock mechanism 56 components through a polymer master batch additive (MB) process like that used with the curtain pull 10 components. The curtain pull 10 components may also be composed of the polyamide with glass fiber, exclusively or in part.

The curtain pull 10 seen in FIG. 10, wherein the curtain gripping elements 48, 50 comprise magnets, may also operate without the use of the lock mechanism 56. Under such circumstances, the magnets are selected, in size and strength, to enable the curtain pull 10 to securely engage the privacy curtain 16 without further assistance from an additional lock mechanism 56.

Figure 18:
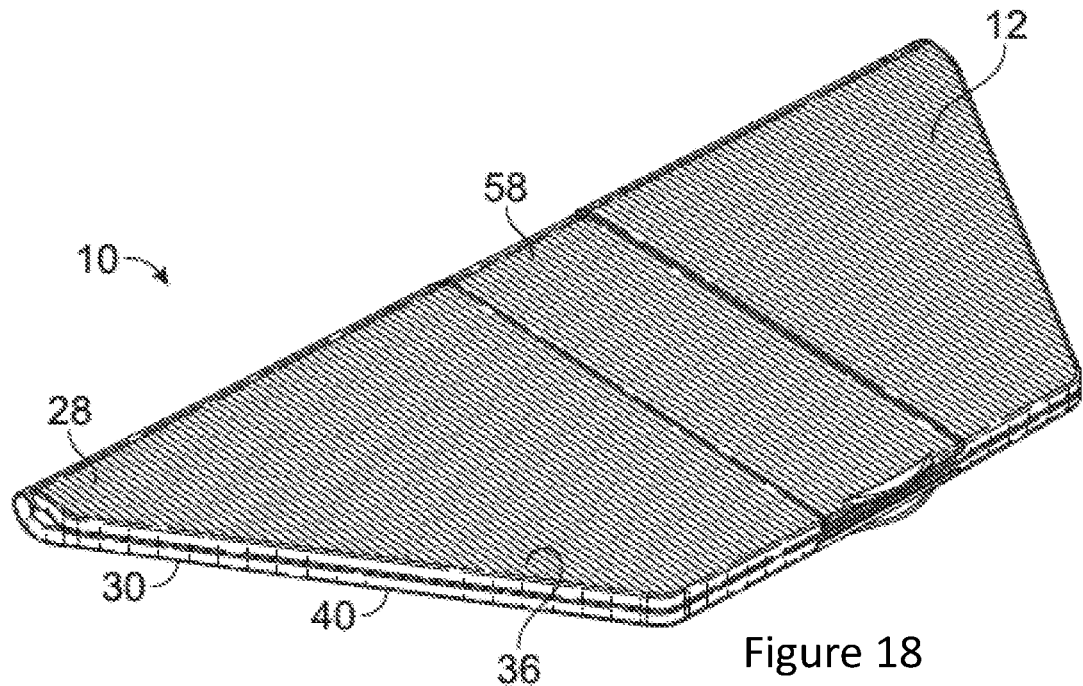
FIG. 18 is a perspective view of yet another embodiment of a locking mechanism disposed on a still further embodiment of the curtain pull.

In some embodiments, for example as seen in FIGS. 2-5 and 7-11 of the present invention, the overall configuration of the curtain pull 10 is generally semi-circular or semi-elliptical with the hinges 32, 34 disposed at the centerline 18 and the curvature extending away from the centerline 18. Alternative overall configurations are also available without deviating from the scope of the invention. For example without limitation, as shown in the embodiment in FIG. 17, the overall configuration can be rectangular and as shown in embodiment of FIG. 18, the overall configuration (in the closed position) can be trapezoidal.

The physical structure and material composition of the curtain pull 10 has been described with regard to FIGS. 1-18. Another aspect of the curtain pull 10 is the rechargeable nature of the anti-BFV polymer chemical composition. Such rechargeable material provides an opportunity for creating a method for ensuring that the curtain pull 10 is cleaned at periodic intervals as may be required to maximize the effectiveness of the material. For example, a schedule may be kept for recharging the curtain pull 10. The schedule may be kept using a paper checklist, for example, that a cleaning crewmember manually checks off for each curtain pull 10, when it has been recharged. The frequency of the recharging may be determined by the level of traffic through the room having the curtain pull 10 or by other factors such as the level of contagion of the patients in the room. Rooms housing highly contagious patients may require a more frequent cleaning schedule than rooms housing less contagious patients.

While preferred embodiments of a curtain pull have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent to one skilled in the art, and all equivalent relationships to those illustrated in the drawings and described in the specification are intended to be encompassed by the present invention.

Throughout this specification, unless the context requires otherwise, the word "comprise" or variations such as "comprises" or "comprising" or the term "includes" or variations, thereof, or the term "having" or variations thereof will be understood to imply the inclusion of a stated element or integer or group of elements or integers but not the exclusion of any other element or integer or group of elements or integers. In this regard, in construing the claim scope, an embodiment where one or more features is added to any of the claims is to be regarded as within the scope of the invention given that the essential features of the invention as claimed are included in such an embodiment.

Those skilled in the art will appreciate that the invention described herein is susceptible to variations and modifications other than those specifically described. It is to be understood that the invention includes all such variations and modifications that fall within its spirit and scope. The invention also includes all of the steps, features, compositions and compounds referred to or indicated in this specification, individually or collectively, and any and all combinations of any two or more of said steps or features.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

INDUSTRIAL APPLICABILITY

A curtain pull is made from rechargeable anti-bacterial, anti-fungal, and anti-viral (anti-BFV) material that kills pathogens on contact and can be recharged with a Chlorine solution. The curtain pull geometry allows it to be securely clamped onto a curtain so that a position of the curtain can be adjusted without touching the curtain directly. The curtain pull can be manufactured in industry and can be used in the healthcare and home care professions to inhibit the spread of pHAIs.

I claim:

1. A curtain pull, comprising:
   inner and outer surfaces;
   first and second identical leaves each rotatably connected to the other along an edge by a connector;
   the first leaf comprising a first portion of the inner surface and a first portion of the outer surface; and
   the second leaf comprising a second portion of the inner surface and a second portion of the outer surface; wherein
   the curtain pull transforms by folding at the connector from an open state wherein the first and second portions of the inner surface are relatively rotated on the connector at a non-zero angle to a closed state wherein the first and second portions of the inner surface are in opposed contact; and wherein
   the first and second portions of the inner surface each comprise a plurality of first curtain gripping elements arranged to interlock together to releasably engage a curtain in the closed state.

2. The curtain pull of claim 1 wherein the connector comprises at least a first hinge, the first hinge comprising a first hinge portion on the first leaf and a second hinge portion on the second leaf.

3. The curtain pull of claim 1 wherein each first gripping element of the plurality of first curtain gripping elements has a shape selected from the group consisting of a conical protuberance, a frusto-conical protuberance, a cylindrical protuberance, an angled rectangular block, a straight rectangular block, and a gripping ramp element.

4. The curtain pull of claim 1 wherein at least one of the first and second portions of the outer surface comprises a grip texture or a grip contour.

5. The curtain pull of claim 1, wherein at least a portion of the outer surface comprises anti-bacterial, anti-fungal, and anti-viral (anti-BFV) material, and wherein the anti-BFV material is rechargeable through application of a chlorine containing solution.

6. The curtain pull of claim 1 further comprising a lock mechanism engaging the first and second portions of the outer surface in the closed state.

7. The curtain pull of claim 6, wherein the lock mechanism comprises a first clasp having a first lip in releasable engagement with a first ridge disposed on the first portion of the outer surface and a second lip in releasable engagement with a second ridge disposed on the second portion of the outer surface.

8. The curtain pull of claim 6, wherein the lock mechanism comprises a polyamide with a glass fiber component, where the glass fiber component comprises from about 1% to about 30% by weight.

9. The curtain pull of claim 6, wherein at least a portion of an exterior surface of the lock mechanism comprises a chemical additive that, when exposed to a chlorine containing solution binds chlorine molecules to the surface of the curtain pull resulting in anti-bacterial, anti-fungal, and anti-viral (anti-BFV) properties, and wherein the anti-BFV properties are rechargeable through further exposure to the chlorine containing solution.

10. The curtain pull of claim 1 further comprising a lock mechanism engaging the first and second portions of the outer surface in the closed state, wherein the lock mechanism comprises a polyamide with a glass fiber component, where the glass fiber component comprises from about 1% to about 30% by weight.

11. The curtain pull of claim 10, wherein at least a portion of the outer surface and at least a portion of an exterior surface of the lock mechanism comprise a chemical additive that, when exposed to a chlorine containing solution binds chlorine molecules to the surface of the curtain pull resulting in anti-bacterial, anti-fungal, and anti-viral (anti-BFV) properties, and wherein the anti-BFV properties are rechargeable through further exposure to the chlorine containing solution.

12. A curtain pull, comprising:

inner and outer surfaces;

first and second identical leaves each rotatably connected to the other along an edge by a connector;

the first leaf comprising a first portion of the inner surface and a first portion of the outer surface; and the second leaf comprising a second portion of the inner surface and a second portion of the outer surface; wherein the curtain pull transforms by folding at the connector from an open state wherein the first and second portions of the inner surface are relatively rotated on the connector at a non-zero angle to a closed state wherein the first and second portions of the inner surface are in opposed contact; wherein the first and second portions of the inner surface each comprise a plurality of first curtain gripping elements arranged to interlock together to releasably engage a curtain in the closed state; and wherein a lock mechanism engages the first and second portions of the outer surface in the closed state.

13. The curtain pull of claim 12, wherein at least a portion of the outer surface and at least a portion of an exterior surface of the lock mechanism comprise a chemical additive that, when exposed to a chlorine containing solution binds chlorine molecules to the surface of the curtain pull resulting in anti-bacterial, anti-fungal, and anti-viral (anti-BFV) properties, and wherein the anti-BFV properties are rechargeable through further exposure to the chlorine containing solution.

* * * * *